J. H. PITTS.
Broom-Handle Socket.
No. 163,245. Patented May 11, 1875.
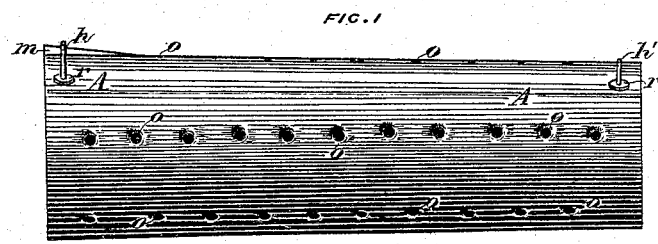
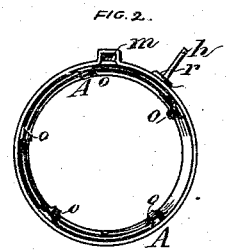
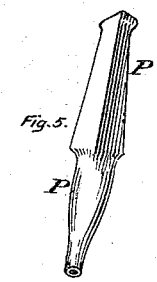
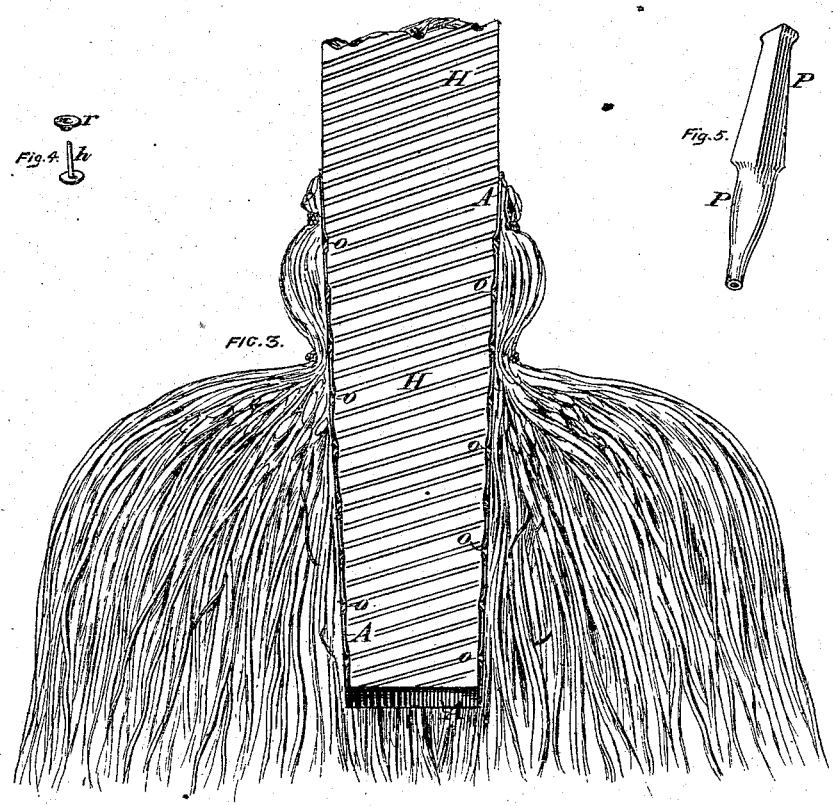
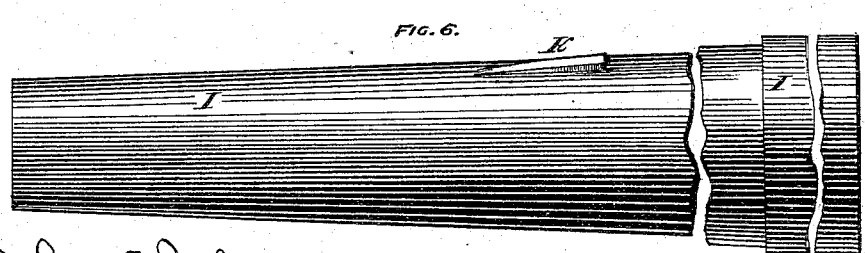
Witnesses: John C. Johnson, Lionel Varicas
Inventor: John H. Pitts
THE GRAPHIC CO. PHOTO-LITH. 39 & 41 PARK PLACE, N.Y.

UNITED STATES PATENT OFFICE.

JOHN H. PITTS, OF SAN FRANCISCO, CALIFORNIA.

IMPROVEMENT IN BROOM-HANDLE SOCKETS.

Specification forming part of Letters Patent No. 163,245, dated May 11, 1875; application filed February 5, 1875.

*To all whom it may concern:*

Be it known that I, JOHN H. PITTS, of the city and county of San Francisco, State of California, have invented Improvements on Broom-Handle Sockets, of which the following is a specification:

My invention consists essentially of a broom-handle socket made of sheet metal or other suitable material and provided with projecting inner burrs for fixing it to the handle, a raised portion for adjusting it to a mandrel of a broom-machine, and loose rivets with small burred caps for both securing these rivets, the socket at its meeting ends or seam, and the binding-wire for the broom-corn used in the manufacture of the broom; the object of my invention being to construct a broom wherein the broom head and handle may be separately packed, as in adjustable brooms, but when once the handle has been driven into this socket on which the broom-head is made, they shall be firmly bound and held together by these projecting burrs on the socket embedding themselves into the wood of the handle, and thus preventing such handle becoming loose.

Figures 1 and 2 are a side and end view, respectively, of a broom-socket embodying my invention. Fig. 3 is a longitudinal vertical section of a socket embodying my invention, showing part of broom head and handle attached. Fig. 4 is a perspective view of a rivet and a securing burred cap or metal ring plate for fastening the seam of the socket and the binding-wire for the broom-corn. Fig. 5 is a perspective view of the punch used for securing the rivets, burred caps, and socket together. Fig. 6 is a side view of a mandrel adapted for the adjustment of this socket to a broom-machine during the manufacture of a broom thereon.

With reference to the drawing, A A represent the socket which is made of sheet metal or other suitable material, and may be either straight or taper in form. The meeting or lapping ends $e\ e$ which form the seam of this socket are provided with holes for rivets $h\ h'$ to enter into, so that such rivets may be capped by small thin sheet metallic disks $r\ r'$, provided with central holes, around which in their construction burrs have been left, so that when a punch, P P, is made to fit over the shank of one of these rivets, capped by one of these metallic disks and hammered down, the burred portion will fill up around the shank of the rivet, secure it in position, and bind the lapping ends of the socket together. For a portion of the whole length of the socket thus constructed several small holes, $o$, at suitable places, are punched so that these holes will also be surrounded with burrs which project inward, and when an ordinary wooden handle, either straight or tapered at the end, is driven into a socket, as described, similarly shaped and corresponding in size, these burrs will form grooves in the wood, and be embedded so thoroughly as to firmly hold the handle with a gripe distributed around the whole or nearly the whole of the socket.

For the manufacture of the broom-head this socket is slid onto a mandrel, I, provided with a raised feather, $k$, which projects for about an eighth of an inch at one end and tapers off longitudinally to nothing at the other, so that it may fit to a correspondingly raised portion, $m$, in the socket, and when the mandrel with socket is attached to a broom-machine the laying or spreading of the corn sprigs may be performed in the same manner as in detachable socket-brooms, the binding-wire being secured to the projecting rivet-shanks.

I make no claim to the mandrel I provided with projection $k$, as I am aware that the same cannot be embodied in this application; also, I do not claim the rivets $h\ h'$ with burred caps $r\ r'$, as I am aware that this is not new; but—

What I claim as my invention, and for which I am desirous of obtaining Letters Patent of the United States, is—

The herein-described broom handle socket A, provided with burred perforations $o$ and hood or bulge $m$, substantially as and for the purposes specified.

JOHN H. PITTS.

Witnesses:
HENRY C. BLAKE,
LIONEL VARICAS.